(12) United States Patent
Presz, Jr. et al.

(10) Patent No.: US 8,573,933 B2
(45) Date of Patent: Nov. 5, 2013

(54) SEGMENTED WIND TURBINE

(75) Inventors: Walter M. Presz, Jr., Wilbraham, MA (US); Michael J. Werle, West Hartford, CT (US); Thomas J. Kennedy, III, Wilbraham, MA (US); William Scott Keeley, Charlestown, RI (US)

(73) Assignee: FloDesign Wind Turbine Corp., Waltham, MA (US)

( * ) Notice: Subject to any disclaimer, the term of this patent is extended or adjusted under 35 U.S.C. 154(b) by 745 days.

(21) Appl. No.: 12/749,951

(22) Filed: Mar. 30, 2010

(65) Prior Publication Data

US 2010/0247289 A1 Sep. 30, 2010

Related U.S. Application Data

(63) Continuation-in-part of application No. 12/054,050, filed on Mar. 24, 2008, now Pat. No. 8,021,100.

(60) Provisional application No. 61/164,509, filed on Mar. 30, 2009, provisional application No. 60/919,588, filed on Mar. 23, 2007.

(51) Int. Cl.
  *F03D 1/04* (2006.01)

(52) U.S. Cl.
  USPC ...................................... 415/182.1

(58) Field of Classification Search
  USPC .............. 415/182.1, 208.5, 227, 2.1, 4.1, 4.3, 415/4.5, 908
  See application file for complete search history.

(56) References Cited

U.S. PATENT DOCUMENTS

| 1,466,472 | A | * | 8/1923 | Fales .......................... 415/208.3 |
| 3,435,654 | A | | 4/1969 | Papst |
| 4,021,135 | A | | 5/1977 | Pedersen et al. |
| 4,038,848 | A | | 8/1977 | Ichiryu et al. |
| 4,075,500 | A | | 2/1978 | Oman et al. |
| 4,077,206 | A | | 3/1978 | Ayyagari |
| 4,140,433 | A | | 2/1979 | Eckel |
| 4,166,596 | A | | 9/1979 | Mouton, Jr. et al. |
| 4,204,799 | A | | 5/1980 | de Geus |
| 4,302,934 | A | | 12/1981 | Wynosky et al. |
| 4,320,304 | A | | 3/1982 | Karlsson et al. |
| 4,324,985 | A | | 4/1982 | Oman |
| 4,335,801 | A | | 6/1982 | Stachowiak et al. |
| 4,482,290 | A | | 11/1984 | Foreman et al. |
| 4,516,907 | A | | 5/1985 | Edwards |
| 4,684,316 | A | | 8/1987 | Karlsson |
| 4,720,640 | A | | 1/1988 | Anderson et al. |

(Continued)

FOREIGN PATENT DOCUMENTS

| WO | WO 03081031 A1 | 2/2003 |
| WO | 2008118405 A2 | 10/2008 |
| WO | WO 2008/118405 A1 | 10/2008 |

OTHER PUBLICATIONS

International Search Report and Written Opinion of PCT/US2010/029156 mailed May 24, 2010.

(Continued)

*Primary Examiner* — Richard Edgar
(74) *Attorney, Agent, or Firm* — McCarter & English, LLP

(57) ABSTRACT

Disclosed are wind turbines comprising a turbine shroud and optionally an ejector shroud. The shrouds are segmented, or in other words have longitudinal spaces between segments. Such wind turbines have reduced drag load, particularly those loads due to off-axis wind forces.

24 Claims, 17 Drawing Sheets

(56) References Cited

U.S. PATENT DOCUMENTS

| | | | |
|---|---|---|---|
| 4,781,522 | A | 11/1988 | Wolfram |
| 4,786,016 | A | 11/1988 | Presz, Jr. et al. |
| 4,834,614 | A | 5/1989 | Davids et al. |
| 5,083,899 | A | 1/1992 | Koch |
| 5,110,560 | A | 5/1992 | Presz, Jr. et al. |
| 5,213,138 | A | 5/1993 | Presz, Jr. |
| 5,230,369 | A | 7/1993 | Presz, Jr. |
| 5,230,656 | A | 7/1993 | Paterson et al. |
| 5,327,940 | A | 7/1994 | Presz, Jr. |
| 5,440,875 | A | 8/1995 | Torkelson et al. |
| 5,447,412 | A | 9/1995 | Lamont |
| 5,464,320 | A | 11/1995 | Finney |
| 5,506,453 | A | 4/1996 | McCombs |
| 5,554,472 | A | 9/1996 | Aizawa |
| 5,761,900 | A | 6/1998 | Presz, Jr. |
| 5,836,738 | A | 11/1998 | Finney |
| 5,884,472 | A | 3/1999 | Presz, Jr. et al. |
| 5,947,678 | A | 9/1999 | Bergstein |
| 5,992,140 | A | 11/1999 | Hammond et al. |
| 6,016,651 | A | 1/2000 | Hammond et al. |
| 6,082,635 | A | 7/2000 | Seiner et al. |
| 6,127,739 | A | 10/2000 | Appa |
| 6,168,373 | B1 | 1/2001 | Vauthier |
| 6,233,920 | B1 | 5/2001 | Presz, Jr. et al. |
| 6,276,127 | B1 | 8/2001 | Alberti |
| 6,278,197 | B1 | 8/2001 | Appa |
| 6,311,928 | B1 | 11/2001 | Presz, Jr. et al. |
| 6,382,904 | B1 | 5/2002 | Oriov et al. |
| 6,402,477 | B1 | 6/2002 | Cybularz et al. |
| 6,665,907 | B1 | 12/2003 | Lu |
| 6,854,260 | B2 | 2/2005 | Anderson |
| 6,877,960 | B1 | 4/2005 | Presz, Jr. et al. |
| 6,887,031 | B1 | 5/2005 | Tocher |
| 7,017,331 | B2 | 3/2006 | Anderson |
| 7,111,448 | B2 | 9/2006 | Anderson |
| 7,144,216 | B2 | 12/2006 | Hessel |
| 7,218,011 | B2 | 5/2007 | Hiel et al. |
| 7,220,096 | B2 | 5/2007 | Tocher |
| 7,251,927 | B2 | 8/2007 | Anderson |
| 7,256,512 | B1 | 8/2007 | Marquiss |
| 7,270,043 | B2 | 9/2007 | Presz, Jr. et al. |
| 8,021,100 | B2 | 9/2011 | Presz, Jr. et al. |
| 8,376,686 | B2 | 2/2013 | Presz, Jr. et al. |
| 2004/0005226 | A1 | 1/2004 | Smith, III |
| 2005/0207881 | A1 | 9/2005 | Tocher |
| 2006/0151633 | A1 | 7/2006 | Presz, Jr. et al. |
| 2009/0087308 | A2 | 4/2009 | Presz et al. |
| 2009/0148655 | A1 | 6/2009 | Nies |
| 2010/0086393 | A1 | 4/2010 | Presz, Jr. et al. |

OTHER PUBLICATIONS

Igra, O., "Shrouds for Aerogenerators," AIAA Journal, Oct. 1976, pp. 1481-1483, vol. 14, No. 10.

Future Energy Solutions, Inc.'s Wind Tamer™ Turbines video demonstration found on Future Energy Solutions, Inc.'s website (http://www.windtamerturbines.com/about.wind-tamer-turbines.asp), Oct. 8, 2008, Livonia, NY.

Hansen et al., "Effect of Placing a Diffuser Around a Wind Turbine," Wind Energy, 2000, pp. 3:207-213. (No publication month available; however, per MPEP 609.04(a), Applicant submits that the year of publication is sufficiently earlier than the effective U.S. filing date and any foreign priority date so that the particular month of publication is not in issue.)

Igra, O., "Research and Development for Shrouded Wind Turbines," Energy Cons. & Management, 1981, pp. 13-48, vol. 21. (No publication month available; however, per MPEP 609.04(a), Applicant submits that the year of publication is sufficiently earlier than the effective U.S. filed and any foreign priority date so that the particular month of publication is not in issue.)

International Preliminary Report on Patentability for Int'l Appln. No. PCT/US2011/035456, dated Nov. 22, 2012 (8 pages).

Werle, M.J. & Presz Jr., W. M., "Ducted Wind/Water Turbines and Propellers Revisited," Journal of Propulsion and Power, vol. 24, No. 5 (Sep. 2008), 1146-1150.

* cited by examiner

FIG. 3A
(PRIOR ART)
FIG. 3B
(PRIOR ART)
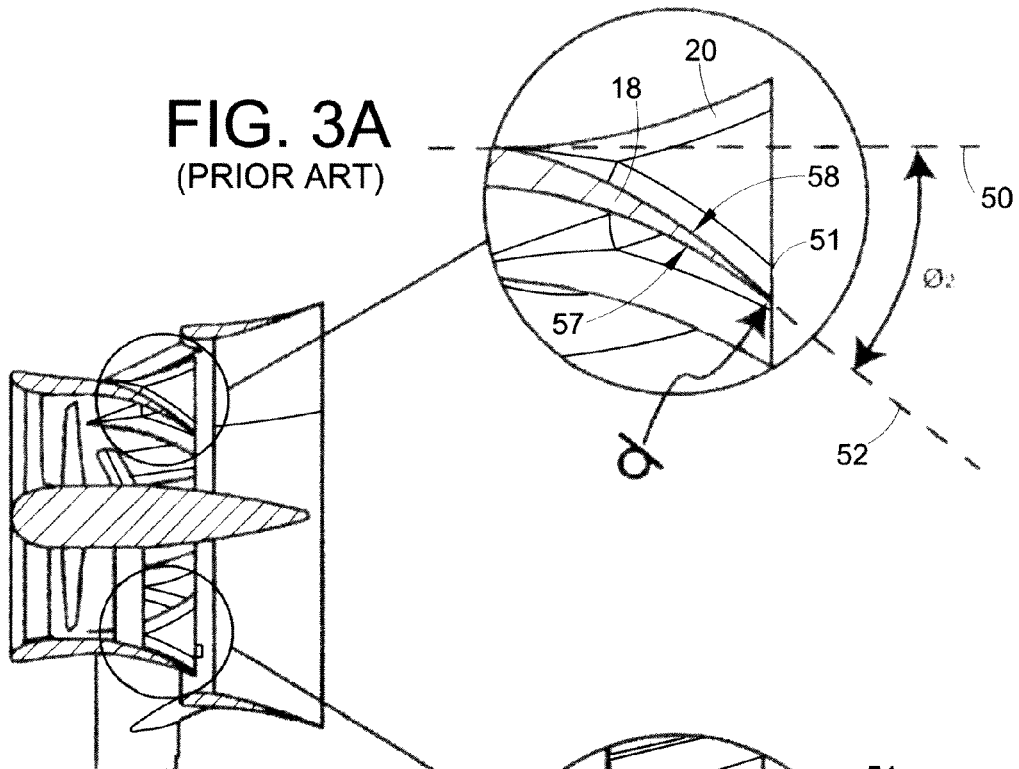
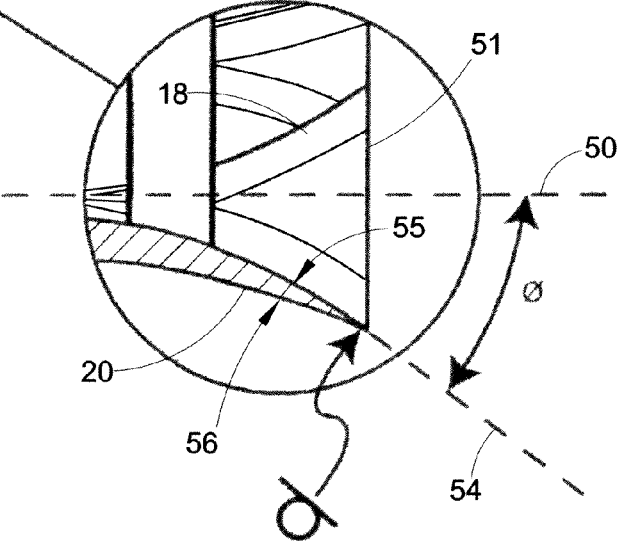

SEGMENTED WIND TURBINE

This application claims priority from Applicants' U.S. Provisional Patent Application Ser. No. 61/164,509 filed Mar. 30, 2009. This application is also a continuation-in-part from U.S. patent application Ser. No. 12/054,050, filed Mar. 24, 2008, which claimed priority from U.S. Provisional Patent Application Ser. No. 60/919,588, filed Mar. 23, 2007. Applicants hereby incorporate the disclosure of these applications by reference in their entirety.

BACKGROUND

The present disclosure relates to wind turbines, particularly shrouded wind turbines including at least one segmented shroud.

Conventional wind turbines have three blades and are oriented or pointed into the wind by computer controlled motors. These turbines typically require a supporting tower ranging from 60 to 90 meters in height. The blades generally rotate at a rotational speed of about 10 to 22 rpm. A gear box is commonly used to step up the speed to drive the generator, although some designs may directly drive an annular electric generator. Some turbines operate at a constant speed. However, more energy can be collected by using a variable speed turbine and a solid state power converter to interface the turbine with the generator. Such turbines are generally known as horizontal axis wind turbines, or HAWTs. Although HAWTs have achieved widespread usage, their efficiency is not optimized. In particular, they will not exceed the Betz limit of 59.3% efficiency in capturing the potential energy of the wind passing through it.

Several problems are associated with HAWTs in both construction and operation. The tall towers and long blades are difficult to transport. Massive tower construction is required to support the heavy blades, gearbox, and generator. Very tall and expensive cranes and skilled operators are needed for installation. In operation, HAWTs require an additional yaw control mechanism to turn the blades toward the wind. HAWTs typically have a high angle of attack on their airfoils that do not lend themselves to variable changes in wind flow. HAWTs are difficult to operate in near ground, turbulent winds. Ice build-up on the nacelle and the blades can cause power reduction and safety issues. Tall HAWTs may affect airport radar. Their height also makes them obtrusively visible across large areas, disrupting the appearance of the landscape and sometimes creating local opposition. Finally, downwind variants suffer from fatigue and structural failure caused by turbulence.

One type of wind turbine that has been developed to overcome the disadvantages of a HAWT is a shrouded wind turbine, such as that disclosed in U.S. patent application Ser. No. 12/054,050, which originally published on Sep. 25, 2008. The turbine has a turbine shroud composed of a ringed airfoil that is cambered to produce low pressure on the inside of the airfoil. The turbine may also have one or more ejector shrouds behind and partially enclosing the turbine shroud. The ejector shroud is also composed of a ringed airfoil that is cambered to produce low pressure on the inside of the airfoil. The shrouds may have mixing elements on their trailing edge. Energy is extracted using a prop or rotor/stator assembly with certain aerodynamic features that allow for improved power extraction from the wind energy. High-energy air is pumped into the wind turbine using the shrouds. The high-energy air mixes with and transfers energy to low-energy air downstream of the prop or rotor/stator assembly.

However, one disadvantage of this shrouded wind turbine is the extra cost of the materials needed to produce the increased power possible with this turbine. In addition, the increased surface area of the shrouded turbine increases the drag load experienced by the turbine from winds hitting it, particularly off-axis winds.

It would be desirable to provide a wind turbine design that could reduce the amount of materials used and reduce the drag load.

BRIEF DESCRIPTION

The present disclosure describes wind turbines of reduced mass, size, and lower drag load. In particular, the disclosed wind turbines include at least one segmented shroud. Such wind turbines are lighter and require less substantial supports in the turbine body.

In some embodiments of this disclosure, a wind turbine comprising a turbine shroud is described, the turbine shroud being formed from a plurality of turbine shroud segments, each turbine shroud segment having a cambered cross-section and having a first mixing lobe formed on a trailing edge; wherein the turbine shroud segments are spaced circumferentially apart to form a discontinuous airfoil, second mixing lobes being defined by the spaces between the turbine shroud segments, the turbine shroud segments being oriented to produce low pressure on an interior side of the turbine shroud.

In other embodiments of this disclosure, described is a wind turbine comprising a continuous turbine shroud and an ejector shroud located concentrically about an outlet end of the turbine shroud; wherein the turbine shroud comprises a leading edge ring member and a plurality of mixing lobes along a trailing edge, the leading edge ring member having an airfoil shape that produces low pressure on an inside of the turbine shroud; wherein the ejector shroud is formed from a plurality of ejector shroud segments attached to the turbine shroud; and wherein the ejector shroud segments are spaced circumferentially apart to form a discontinuous airfoil shape and oriented to produce low pressure on an inside of the ejector shroud.

In still other embodiments of this disclosure, described are methods of making a wind turbine comprising (a) providing a wind driven turbine; (b) forming a plurality of turbine shroud segments having an airfoil cross-section with a first mixing lobe on the airfoil trailing edge; and (c) disposing the turbine shroud segments about the turbine in circumferentially spaced arrangement with the spaces between the segments defining second mixing lobes, the turbine shroud segments being oriented to produce low pressure on an interior side of the turbine shroud.

These and other non-limiting features or characteristics of the present disclosure will be further described below.

BRIEF DESCRIPTION OF THE DRAWINGS

The following is a brief description of the drawings, which are presented for the purpose of illustrating the disclosure set forth below and not for the purpose of limiting the same.

FIGS. 3A and 3B are magnified views of the mixing lobes of the wind turbine of FIG. 1.

DETAILED DESCRIPTION

Figure 1:
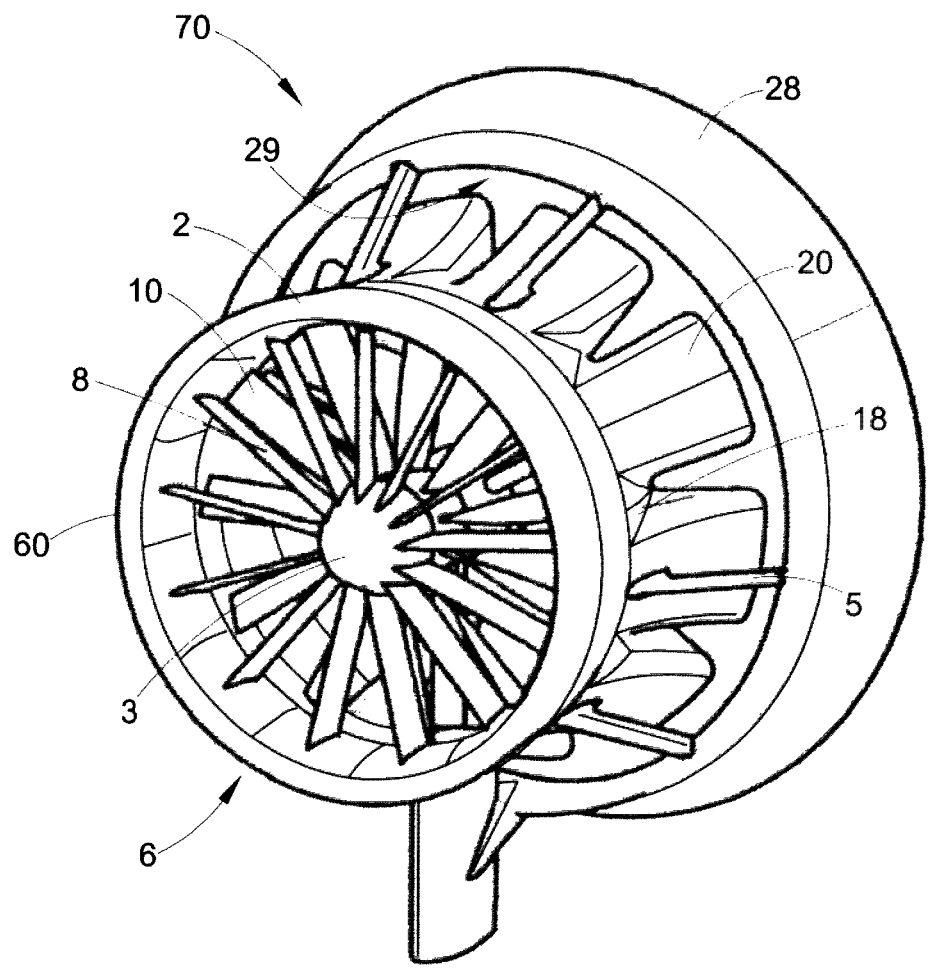
FIG. 1 is a front perspective view of a conventional shrouded wind turbine.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range of "from about 2 to about 10" also discloses the range "from 2 to 10."

As used herein, the term "impeller" refers to an assembly that converts the linear force of wind on a surface into a rotary motion. Exemplary impellers include a propeller or a rotor/stator assembly. Though some of the figures show either a propeller or a rotor/stator assembly, they should be considered as being used interchangeably in the present disclosure.

Figure 2:
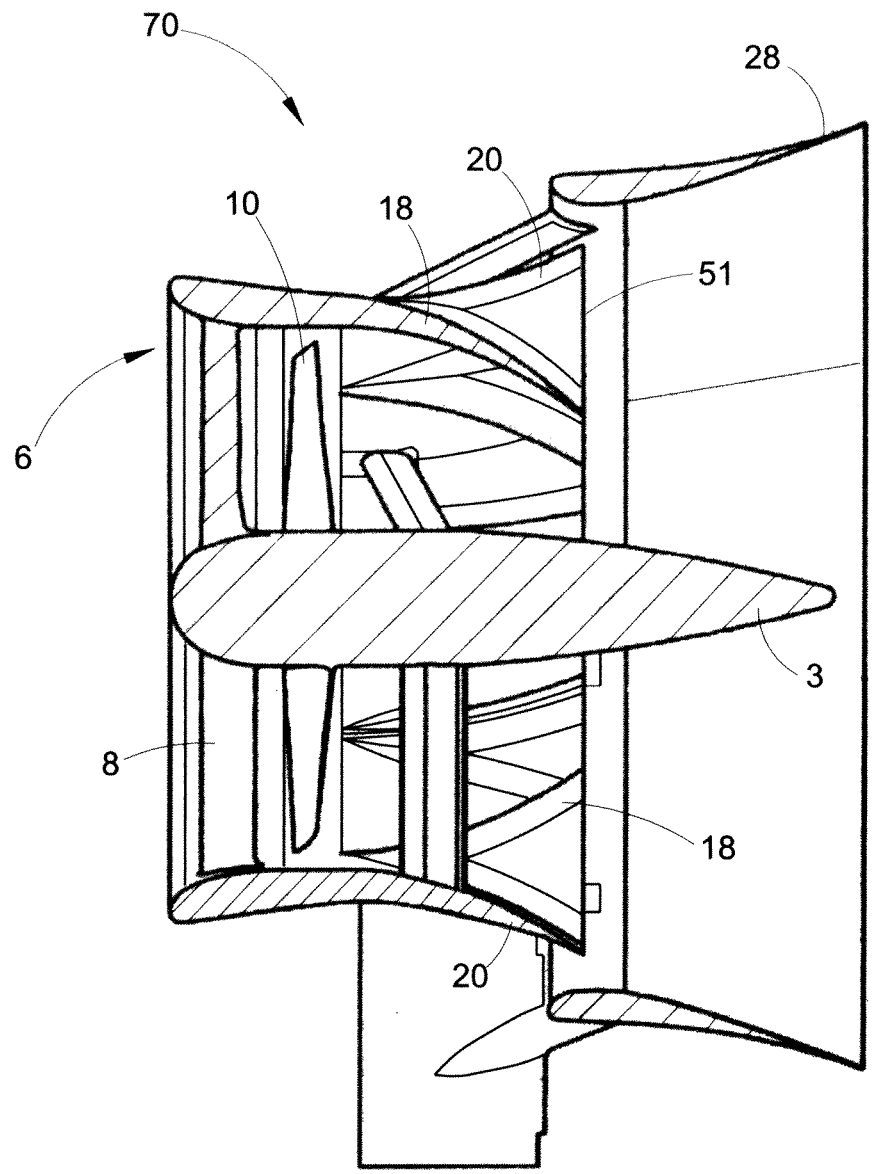
FIG. 2 is a side cross-sectional view of the wind turbine of FIG. 1.

FIGS. 1-3 illustrate a known shrouded wind turbine having mixers and ejectors. The wind turbine indicated generally at 70 in FIG. 1 has a stator 8 and a rotor 10 configuration for power extraction. The turbine shroud 2 surrounds the rotor 10 and is supported by or connected to the blades of the stator 8, which is in turn connected to a nacelle or center body 3. The turbine shroud 2 is cambered, i.e. has the shape of an inverted airfoil in transverse section with the suction side (i.e. low pressure side) on the interior of the shroud. Put another way, the turbine shroud is shaped to take advantage of the Bernoulli effect, creating low pressure on one side (the interior) and high pressure on the other side (the exterior). An ejector shroud 28 is disposed coaxial with the turbine shroud 2 and is supported by connectors 5 extending between the two shrouds. An annular area is formed between the two shrouds. The outlet end of the turbine shroud 2 is shaped to form two different sets of mixing lobes 18, 20. High energy mixing lobes 18 extend inward towards the central axis of the mixer shroud 2; and the low energy mixing lobes 20 extend outward away from the central axis.

Free stream air indicated generally at 6 passing through the stator 8 has its energy extracted by the rotor 10. High energy air indicated generally at 29 bypasses the stator 8 and is brought in on the downstream edge of the turbine shroud 2 by the high energy mixing lobes 18. The low energy mixing lobes 20 cause the low energy air exiting downstream from the rotor 10 to be mixed with the high energy air 29.

The nacelle 3 and the trailing edges of the low energy mixing lobes 20 and the trailing edge of the high energy mixing lobes 18 may be seen in FIG. 2. The ejector shroud 28 is used to draw in the high energy air 29.

In FIG. 3A, a tangent line 52 is drawn along the interior trailing edge indicated generally at 57 of the high energy mixing lobe 18. A rear or downstream plane 51 of the turbine shroud 2 is present. A centerline 50 is formed tangent to the rear plane 51 that intersects the point where a low energy mixing lobe 20 and high energy mixing lobes 18 meet. An angle $Ø_2$ is formed by the intersection of tangent line 52 and centerline 50. In the present practice it has been found satisfactory to have this angle $Ø_2$ between 5 and 65 degrees. Put another way, a high energy mixing lobe 18 forms an angle $Ø_2$ between 5 and 65 degrees relative to the turbine shroud 2.

In FIG. 3B, a tangent line 54 is drawn along the interior trailing edge indicated generally at 55 of the low energy mixing lobe 20. An angle Ø is formed by the intersection of tangent line 54 and centerline 50. In the present practice it has been found satisfactory to have this angle Ø is between 5 and 65 degrees. Put another way, a low energy mixing lobe 20 forms an angle Ø between 5 and 65 degrees relative to the turbine shroud 2.

The turbine shroud 2 and the ejector shroud 28 are both "continuous" shrouds. Put another way, with reference to FIG. 1, the turbine shroud can be considered as having a surface that is unbroken running longitudinally between the inlet end 60 and the outlet end 51 and also unbroken circumferentially around the turbine shroud. Similarly, the ejector shroud 28 has a surface that is unbroken running both longitudinally and circumferentially.

Figure 4:
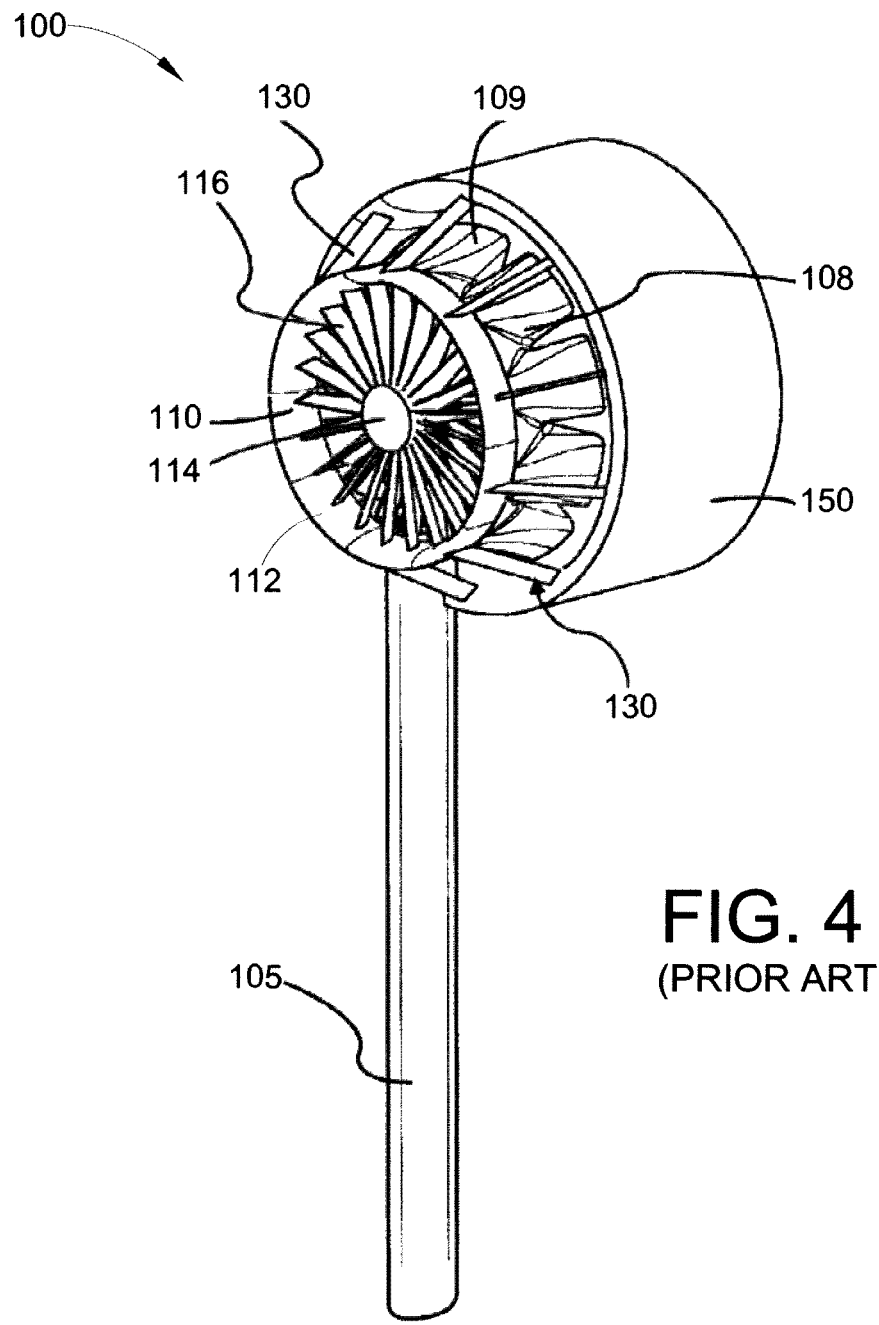
FIG. 4 is a picture of a wind turbine tower.

FIG. 4 illustrates a wind turbine tower. The wind turbine 100 includes a turbine shroud 110 and an ejector shroud 150. The turbine shroud 110 is attached to a support base or tower 105 which raises the turbine above the ground. The turbine shroud 110 includes a continuous leading edge ring member 112. A plurality of high energy mixing lobes 108 and a plurality of low energy mixing lobes 109 are defined along a trailing edge of the turbine shroud 110, or could be considered as making up the outlet end of the turbine shroud 110. Again, the high energy mixing lobes extend inwardly towards the central axis, and the low energy mixing lobes extend outwardly away from the central axis. The turbine shroud is supported by or connected to a plurality of stator vanes 116, which in turn connect the turbine shroud to the nacelle 114. The rotor (not visible) is disposed adjacent and downstream of the stator and is rotatably engaged with the nacelle 114 as well. A continuous ejector shroud 150 is disposed concentrically about the turbine shroud 110 and is connected to the turbine shroud 110 by support members 130. The outlet end of the turbine shroud extends into the inlet end of the ejector shroud.

In contrast to the foregoing, the present disclosure describes wind turbines having a discontinuous, or segmented, shroud as will be described hereinafter in detail. The segmented shroud may be either the turbine shroud or the ejector shroud, or both. The overall shroud defined by the segments will still have an airfoil shape and have a camber such that the reduced pressure or suction side of the airfoil is on the interior of the shroud. This allows air to be drawn into the front of the turbine and increase the free stream flow, energizing the overall flow through the turbine. However, instead of a continuous shroud, the segmented shroud will have a longitudinal space on both sides of any given segment. The segmented shrouds of the disclosure are less prone to drag loads exerted by off-axis winds on solid surfaces. The lower drag load allows the wind turbine to withstand greater wind forces, and/or to be constructed of materials of lower strength and/or cost.

Figure 5A:
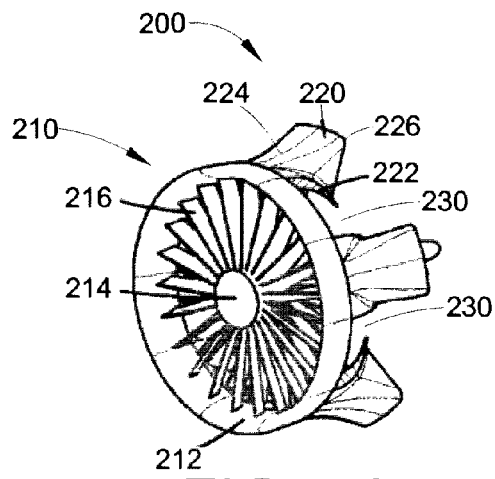
FIGS. 5A and 5B are front and rear perspective views of a first exemplary embodiment of a wind turbine of the present disclosure.
Figure 5B:
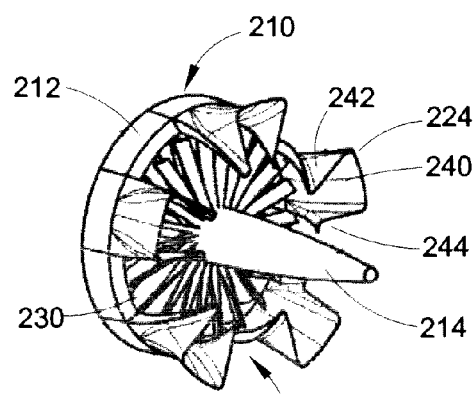

FIG. 5A and FIG. 5B are front and rear perspective views of a first exemplary version or embodiment of a turbine 200 with a shroud indicated generally at 210. The turbine shroud 210 includes a continuous leading edge ring member 212 which is connected to a nacelle 214 by a plurality of stator vanes 216. The leading edge ring member forms a leading edge of the turbine shroud.

Connected to the leading edge ring member is a plurality of turbine shroud segments 220. This embodiment is shown with five such exemplary segments; however, the number of segments may be varied and is not limited to five. Each turbine shroud segment 220 has a streamlined airfoil shape in cross-section (reference numeral 222). A first mixing lobe 224 is formed on a trailing edge 226 of the turbine shroud segment 220. The turbine shroud segments 220 are connected to the leading edge ring member 212 such that the mixing lobes 224 also form an outlet end of the overall turbine shroud 210. The turbine shroud segments 220 are spaced circumferentially apart from each other as well, with spaces 230 between adjacent turbine shroud segments. As a result, the turbine shroud segments form what may be considered an annular, cylindrical, or discontinuous airfoil. The segments may be spaced evenly about the circumference, when viewed along the central axis of the turbine. The turbine shroud segments are oriented to produce low pressure on an interior side of the turbine shroud, i.e. the inside of the turbine shroud. Comparing FIG. 5B with the prior art device of FIG. 1, the longitudinal spaces between turbine shroud segments of the present disclosure can be considered as defining second mixing lobes indicated at 234. In this embodiment, the first mixing lobes 224 are analogous to the low energy mixing lobes 20 of FIG. 1, while the second mixing lobes 234 are analogous to the high energy mixing lobes 18 of FIG. 1.

Referring now to FIG. 5B, the first mixing lobe 224 is formed from a central circumferential surface 240 and two side surfaces 242, 244. The two side surfaces 242, 244 are substantially perpendicular to the central circumferential surface, when viewed along the central axis of the turbine and extend radially inwardly.

Figure 6A:
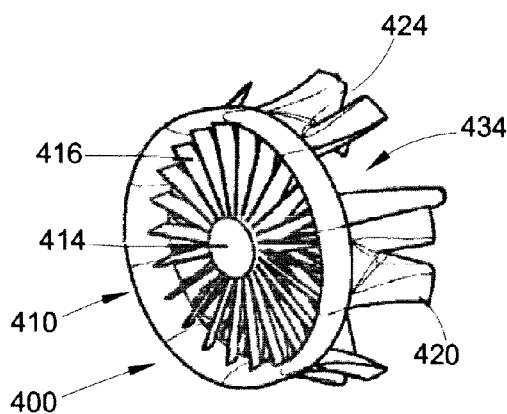
FIGS. 6A and 6B are front and rear perspective views of a second exemplary embodiment of a wind turbine of the present disclosure.
Figure 6B:
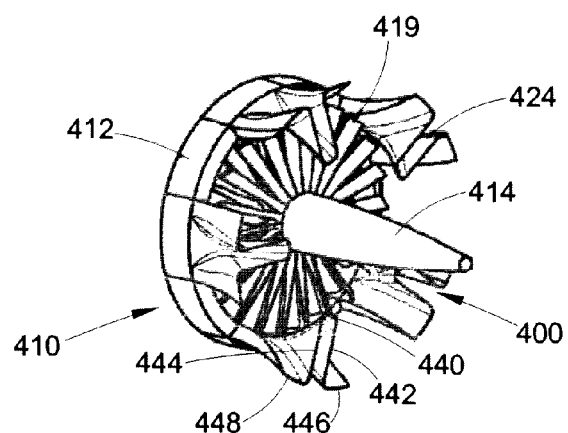

FIG. 6A and FIG. 6B are front and rear perspective views of a second exemplary version or embodiment of a turbine 400 with shroud 410 formed by turbine shroud segments 420. In the version 400, the first mixing lobes 424 are analogous to the high energy mixing lobes 18 of FIG. 1, while the second mixing lobes indicated generally at 434 are analogous to the low energy mixing lobes 20 of FIG. 1. In addition, besides the central circumferential surface 440 and two side surfaces 442, 444, each first mixing lobe 424 includes two edge circumferential surfaces 446, 448. As seen here, the two edge circumferential surfaces provide some definition to the second mixing lobes 434. In addition, the rotor 419 is visible in FIG. 6B.

Alternatively, the embodiment of FIG. 5A may be considered as being segmented in the middle of the high energy mixing lobes, while the embodiment of FIG. 6A may be considered as being segmented in the middle of the low energy mixing lobes.

Figure 7A:
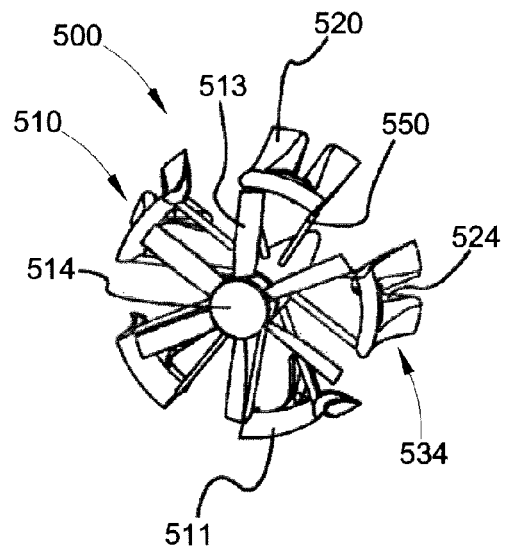
FIGS. 7A and 7B are front and rear perspective views of a third exemplary embodiment of a wind turbine of the present disclosure.
Figure 7B:
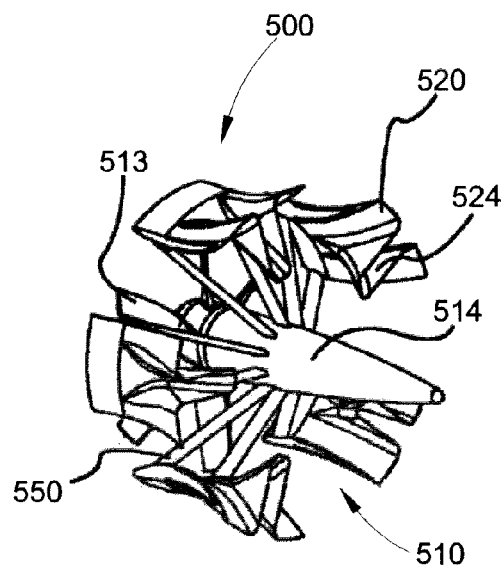

FIG. 7A and FIG. 7B are front and rear perspective views of a third exemplary embodiment 500 having a turbine shroud 510. This turbine shroud does not include a leading edge ring member. Rather, the turbine shroud segments 520 also form the leading edge of the turbine shroud. This leading edge 511 is discontinuous or segmented as well. Here, instead of a rotor/stator assembly, the impeller 513 is free-bladed. The impeller 513 is mounted rotatably on a nacelle 514. The turbine shroud segments 520 are connected to the nacelle or center body 514 by support members 550. Here, the support members are angled forward proceeding radially outwardly so that the leading edge 511 is in front of the impeller 513. The turbine shroud segments include first mixing lobes 524 and define second mixing lobes 534 between every two shroud segments.

Figure 8A:
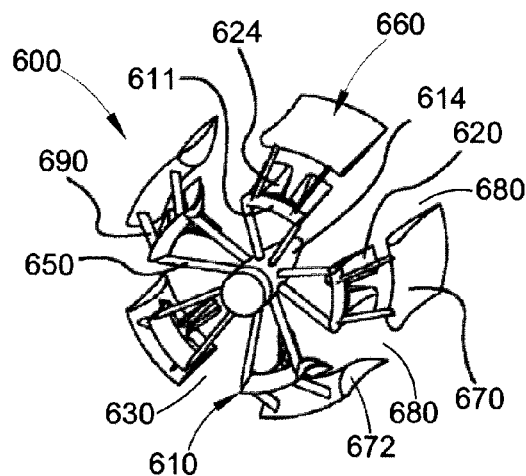
FIGS. 8A and 8B are front and rear perspective views of a fourth exemplary embodiment of a wind turbine of the present disclosure.
Figure 8B:
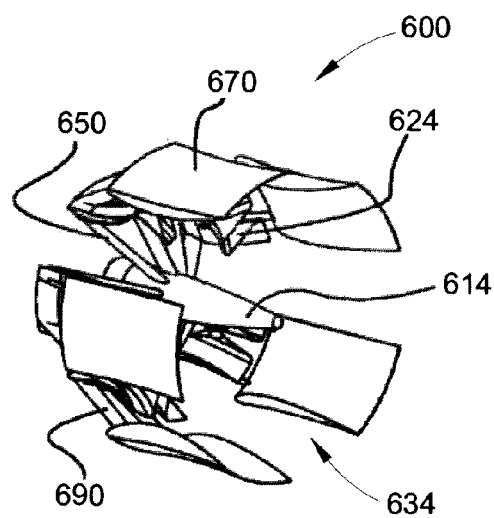

FIG. 8A and FIG. 8B are front and rear perspective views of a fourth exemplary version or embodiment of a wind turbine indicated generally at 600. This wind turbine is similar to that of FIG. 7A, except the impeller is not shown. This embodiment includes a segmented turbine shroud 610 and a segmented ejector shroud indicated generally at 660.

The ejector shroud indicated generally at 660 comprises a plurality of ejector shroud segments 670. Each ejector shroud segment 670 has an airfoil cross-section (reference numeral 672). Each ejector shroud segment 670 is connected to a turbine shroud segment 620 such that the ejector shroud segments form the overall ejector shroud having an inlet end surrounding the outlet end of the turbine shroud. The ejector shroud segments are spaced circumferentially apart from each other as well, with spaces 680 between adjacent ejector shroud segments. As a result, the ejector shroud segments form an annular, cylindrical, or spanwise discontinuous airfoil. The ejector shroud segments may be spaced evenly about the circumference, when viewed along the central axis of the turbine. The ejector shroud produces low pressure on an interior side of the ejector shroud, i.e. the inside of the ejector shroud.

It should be noted that the wind turbine may have more than one ejector shroud. In such embodiments, the first ejector shroud would be concentric with the turbine shroud and partially enclose the outlet end of the turbine shroud. The second ejector shroud would be concentric with the turbine shroud as well, and partially enclose the outlet end of the first ejector shroud. Subsequent ejector shrouds would also be concentric with the turbine shroud and partially enclose the outlet end of the prior ejector shroud.

The turbine shroud segments 620 define a leading edge 611 of the turbine shroud. Each turbine shroud segment is connected to the nacelle 614 via at least one support member 650. Each ejector shroud segment 670 is connected to a turbine shroud segment 620 using at least one support member 690. Here, two support members 690 are used for each ejector shroud segment 670.

As depicted here, each ejector shroud segment 670 is located over a turbine shroud segment 620. Put another way, each ejector shroud segment 670 is located over a first mixing lobe 624. Put yet another way, the longitudinal spaces 680 of the ejector shroud 660 are oriented with, or coincide with, the longitudinal spaces 630 of the turbine shroud 610. If desired, however, each ejector shroud segment could be located over a second mixing lobe 634.

Figure 9A:
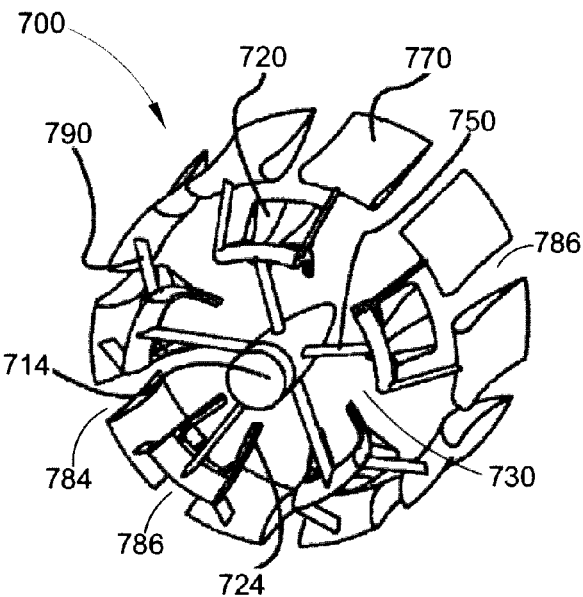
FIGS. 9A and 9B are front and rear perspective views of a fifth exemplary embodiment of a wind turbine of the present disclosure.
Figure 9B:
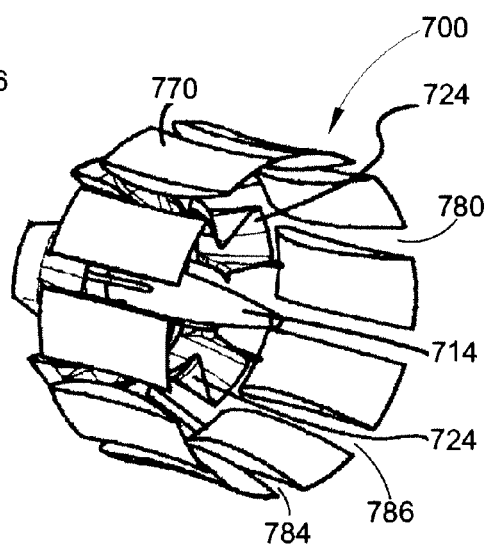

FIG. 9A and FIG. 9B are front and rear perspective views of a fifth exemplary version or embodiment of a wind turbine indicated generally at 700. There are two ejector shroud segments 770 attached to each turbine shroud segment 720, and each ejector shroud segment is attached using only one support member 790. As illustrated here, the number of turbine shroud segments 720 may differ from the number of ejector shroud segments 770. In addition, the spaces 780 may be separated into different groups 784, 786, with one group 784 coinciding with the turbine shroud spaces 730 and the other group 786 coinciding with the turbine shroud segments 720. Again, each turbine shroud segment 720 has a first mixing lobe 724, and each turbine shroud segment 720 is attached to nacelle 714 by support member 750.

Figure 10A:
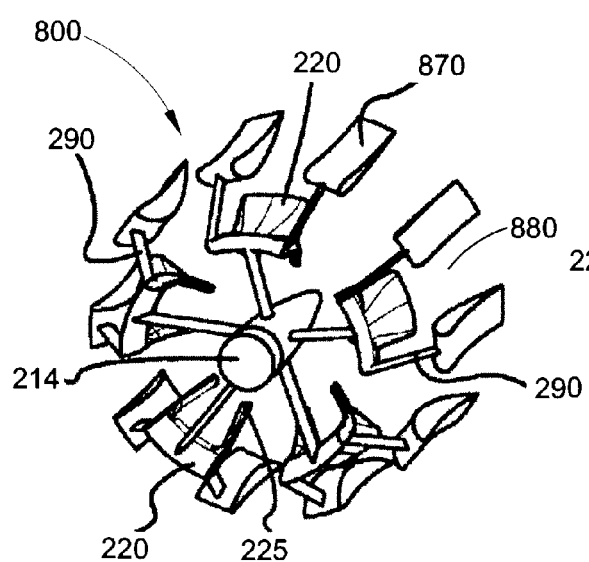
FIGS. 10A and 10B are front and rear perspective views of a sixth exemplary embodiment of a wind turbine of the present disclosure.
Figure 10B:
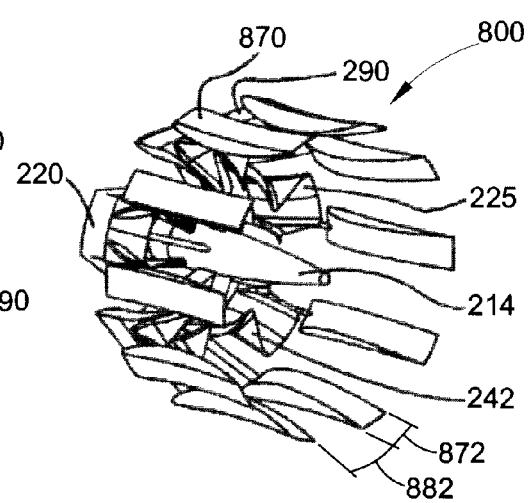

FIG. 10A and FIG. 10B are front and rear perspective views of a sixth version or embodiment of a wind turbine indicated generally at 800. This wind turbine differs from the wind turbine of FIG. 9A in that the ejector shroud segments 870 are narrower. As illustrated, each ejector shroud segment 870 has a spanwise width 872 (measured circumferentially when viewed along the central axis) and each space 880 also has a width 882. The ratio of width 872 to width 882 may vary as desired to change the drag load experienced by the turbine. In the present practice it has been found satisfactory to have a ratio of circumferential width 872 to radial width 882 in the range of about 0.2 to 0.5.

Figure 11:
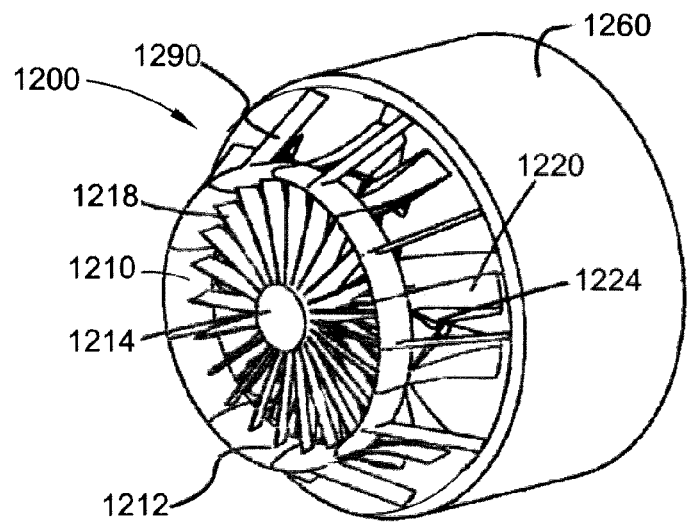
FIG. 11 is one exemplary embodiment of a wind turbine having a segmented turbine shroud and a continuous ejector shroud.
Figure 12:
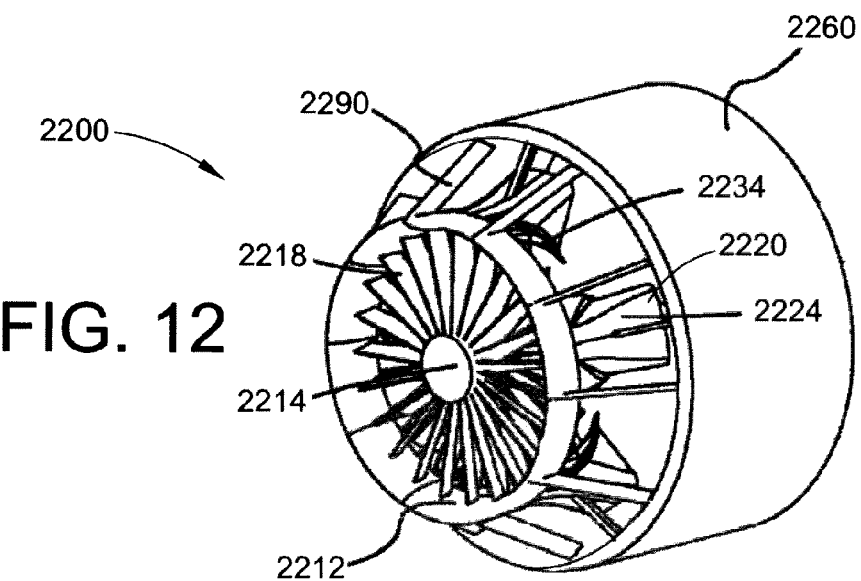
FIG. 12 is another exemplary embodiment of a wind turbine having a segmented turbine shroud and a continuous ejector shroud.

FIG. 11 and FIG. 12 are two embodiments 1200 and 2200 respectively of wind turbines having segmented turbine shrouds indicated generally at 1210, 2210 and continuous ejectors shrouds 1260, 2260. In FIG. 11, the turbine shroud 1210 is similar to that shown in FIG. 5A, while the turbine shroud 2210 of FIG. 12 is similar to that shown in FIG. 6A. Both turbines have a leading edge ring member 1212, 2212 respectively that is continuous, and turbine shroud segments 1220, 2220 are attached to the trailing edge of the leading edge ring member. Each turbine shroud segment includes a first mixing lobe 1224, 2224. The second mixing lobe is indicated in FIG. 12 as reference numeral 2234. The ejector shroud 1260, 2260 is attached to the leading edge ring member 1212, 2212 by support members 1290, 2290. A rotor/stator assembly 1218, 2218 is used here for the impeller, and is attached to nacelle 1214, 2214. The ejector shroud includes a ring airfoil that produces low pressure on an interior side of the ejector shroud.

Figure 13:
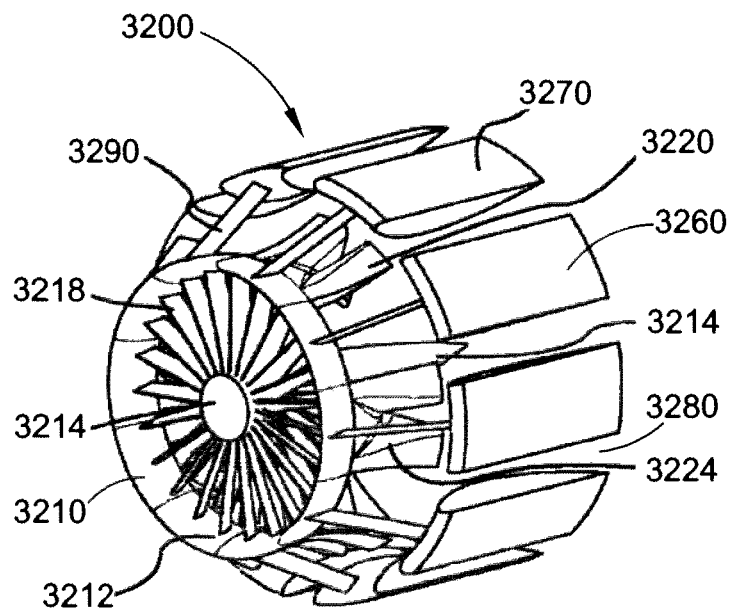
FIG. 13 is an exemplary embodiment of a wind turbine having a segmented turbine shroud and a segmented ejector shroud, the ejector shroud segments being wide and centered with the turbine shroud segments.
Figure 14:
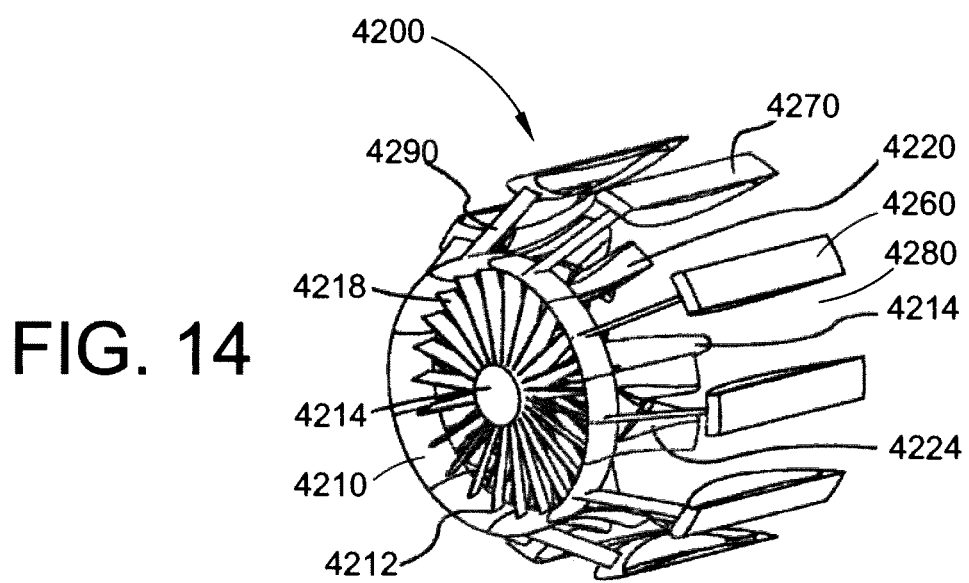
FIG. 14 is an exemplary embodiment of a wind turbine having a segmented turbine shroud and a segmented ejector shroud, the ejector shroud segments being narrow and centered with the turbine shroud segments.

In the alternate versions 3200, 4200 of FIG. 13 and FIG. 14, the ejector shroud 3260, 4260 is also segmented. Each ejector shroud segment 3270, 4270 is attached to the continuous leading edge ring member 3212, 4212 by at least one support member 3290, 4290. The ejector shroud segments of FIG. 14 are narrower circumferentially than those of FIG. 13. There are longitudinal spaces 3280, 4280 between each ejector shroud segment. The ring airfoil shape of the ejector shroud, which produces low pressure on an interior side of the ejector shroud, is visible here. Each turbine shroud segment 3220, 4220 has a first mixing lobe 3224, 4224. A rotor/stator assembly 3218, 4218 is connected to the nacelle 3214, 4214 for supporting the turbine shroud 3210, 4210.

Figure 15:
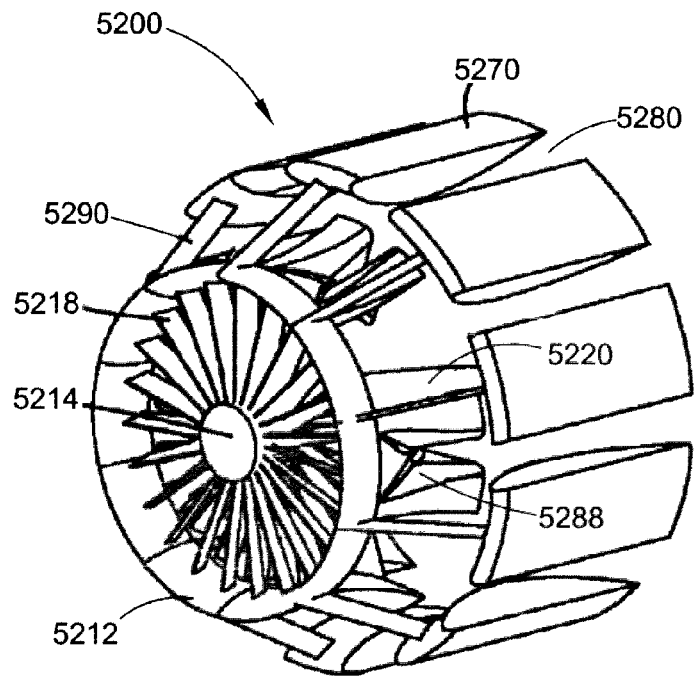
FIG. 15 is an exemplary embodiment of a wind turbine having a segmented turbine shroud and a segmented ejector shroud, the ejector shroud segments being wide and staggered against the turbine shroud segments.
Figure 16:
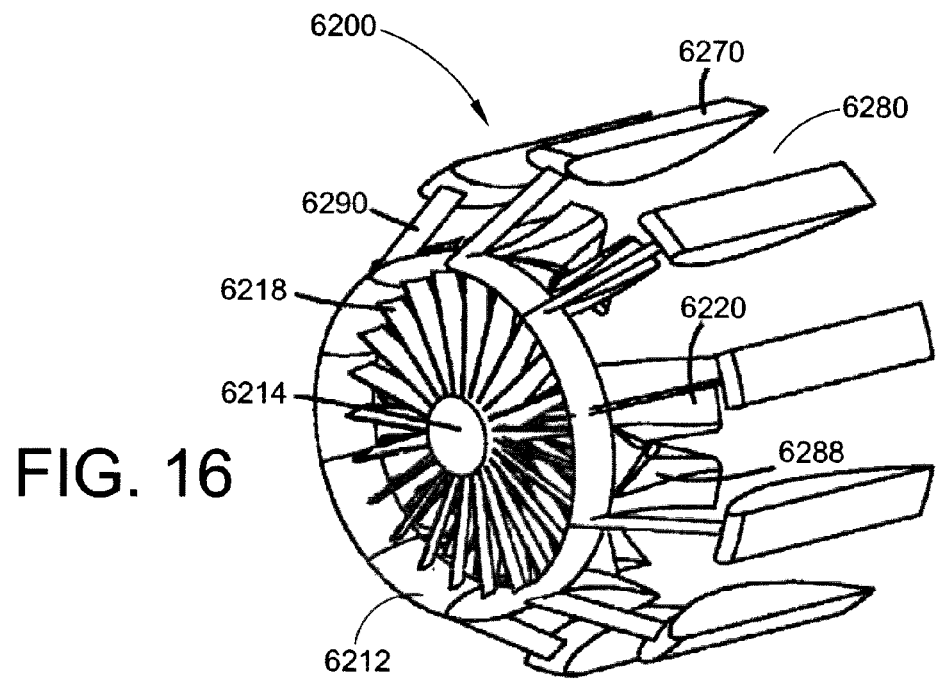
FIG. 16 is an exemplary embodiment of a wind turbine having a segmented turbine shroud and a segmented ejector shroud, the ejector shroud segments being narrow and staggered against the turbine shroud segments.

FIG. 15 and FIG. 16 show another two exemplary embodiments of a turbine 5200, 6200. Again, the turbine shroud includes a leading edge ring member 5212, 6212 which is connected through rotor/stator assembly 5218, 6218 to nacelle 5214, 6214. Turbine shroud segments 5220, 6220 are attached to the leading edge ring member 5212, 6212. As depicted here, the first mixing lobe on each turbine shroud segment 5220, 6220 is a high energy mixing lobe 5288, 6288. Ejector shroud segments 5270, 6270 are also attached to the leading edge ring member through support member 5290, 6290, with longitudinal spaces 5280, 6280 between ejector shroud segments. The turbines 5200, 6200 of FIG. 15 and FIG. 16 differ from FIG. 13 and FIG. 14 in the placement of the ejector shroud segments. In FIG. 13, the ejector shroud segment 3270 is located directly over the first mixing lobe 3224, while in FIG. 15, the ejector shroud segments 5270 are staggered so that a space 5280 between segments is located directly over the first mixing lobe 5288.

FIG. 15 and FIG. 16 show another two exemplary embodiments of a turbine 7200, 8200. Again, the turbine shroud includes a leading edge ring member 7212, 8212 which is connected through rotor/stator assembly 7218, 8218 to nacelle 7214, 8214. Turbine shroud segments 7220, 8220 are attached to the leading edge ring member 7212, 8212. As depicted here, the first mixing lobe on each turbine shroud segment 7220, 8220 is a low energy mixing lobe 7289, 8289. Ejector shroud segments 7270, 8270 are also attached to the leading edge ring member through support member 7290, 8290, with longitudinal spaces 7280, 8280 between ejector shroud segments. The turbines 7200, 8200 of FIG. 17 and FIG. 18 differ from the versions 5200, 6200 of FIG. 15 and FIG. 16 in the type of turbine shroud segment. In FIG. 15, the turbine shroud segment 5220 has a high energy mixing lobe 5288, while the turbine shroud segment 7220 of FIG. 17 has a low energy mixing lobe 7289.

Figure 17:
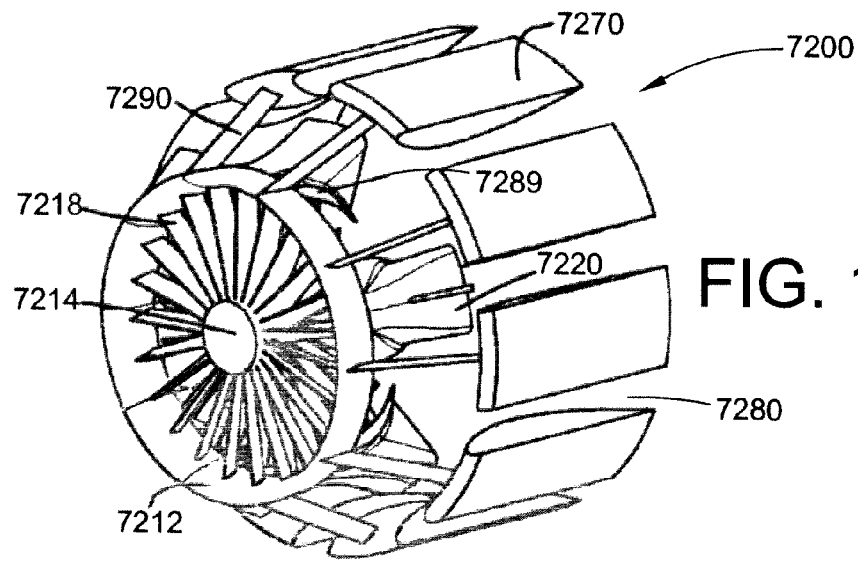
FIG. 17 is an exemplary embodiment of a wind turbine having a segmented turbine shroud and a segmented ejector shroud, the ejector shroud segments being wide and staggered against the turbine shroud segments. The turbine shroud segments are shaped differently from those of FIG. 15.
Figure 18:
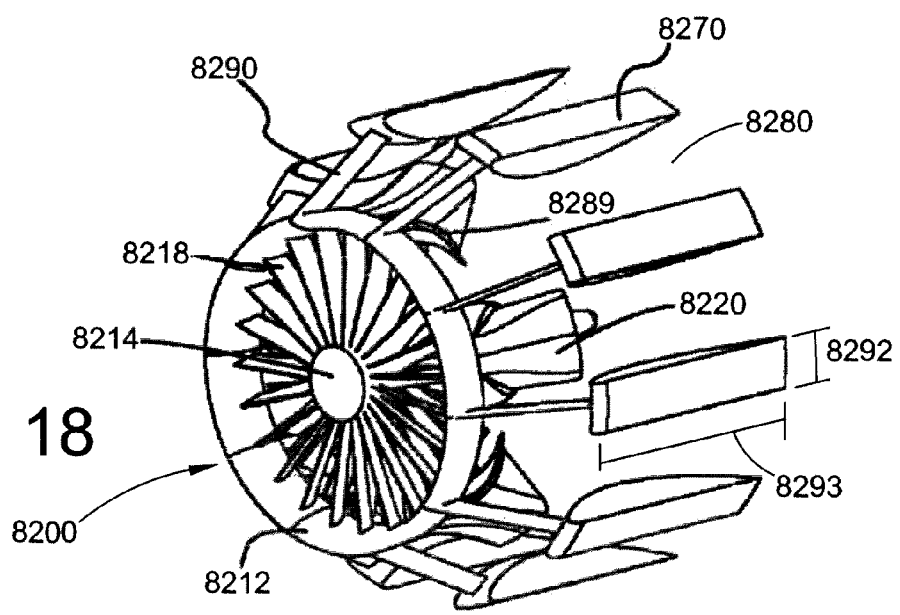
FIG. 18 is an exemplary embodiment of a wind turbine having a segmented turbine shroud and a segmented ejector shroud, the ejector shroud segments being narrow and staggered against the turbine shroud segments. The turbine shroud segments are shaped differently from those of FIG. 16.

In the version 8200 of FIG. 18 the ejector shroud segments 8270 have a lower spanwise aspect ratio than the segments 7270 of FIG. 17. The aspect ratio is the ratio of the span 8292 to the chord 8293. In the present disclosure, the aspect ratio of the ejector shroud segments 8270 may be in the range of about 0.2 to about 0.3; and, the spaces therebetween are greater than in version 7200 of FIG. 17.

Figure 19:
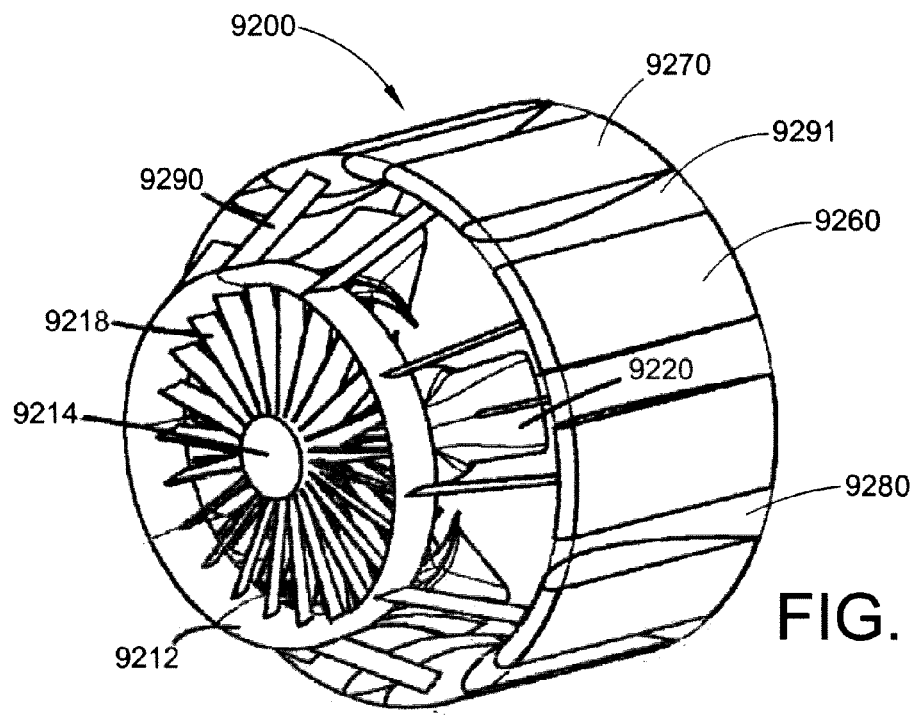
FIG. 19 is an exemplary embodiment of a wind turbine having a segmented turbine shroud and an ejector shroud formed with segments. A thin film material covers the longitudinal spaces between ejector shroud segments, forming a continuous surface.

In the version 9200 of FIG. 19, again, the turbine shroud includes a leading edge ring member 9212 which is connected through rotor/stator assembly 9218 to nacelle 9214. Turbine shroud segments 9220 are attached to the leading edge ring member 9212. Ejector shroud segments 9270 are also attached to the leading edge ring member through support member 9290, with longitudinal spaces 9280 between ejector shroud segments. Here, the spaces 9280 between the ejector shroud segments 9270 are covered with a thin film material 9291, to form a continuous surface for the ejector shroud 9260. The ejector shroud segments themselves can also be covered with the thin film material, if it is desired to use one large piece of thin film rather than several small pieces that cover only the longitudinal spaces.

Figure 20:
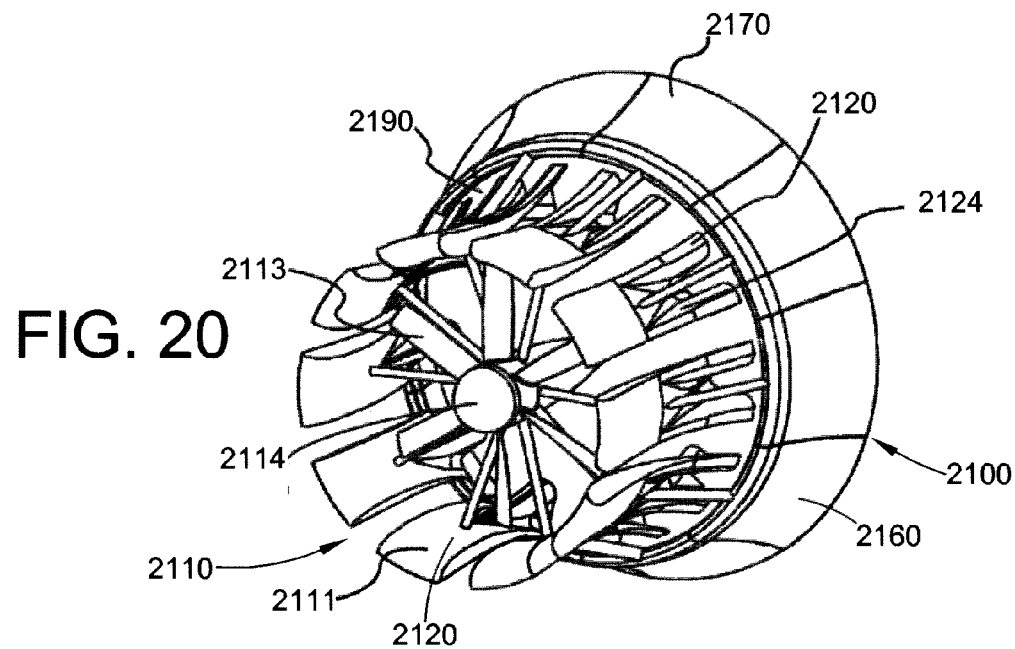
FIG. 20 is an exemplary embodiment of a wind turbine having a segmented turbine shroud and an ejector shroud formed with segments. The leading edge of the turbine shroud is also discontinuous. The ejector shroud segments are sized to form a continuous airfoil, i.e. with no longitudinal spaces between segments.

In the version illustrated in FIG. 20, the turbine 2100 has a segmented turbine shroud indicated generally at 2110 and an ejector shroud 2160. The leading edge 2111 of the turbine shroud 2110 is formed by the turbine shroud segments 2120. The trailing edge of each turbine shroud segment includes a first mixing lobe 2124. The turbine shroud segments 2120 are attached to a center body 2114. A propeller 2113 is used as the impeller. An ejector shroud segment 2170 is attached to each turbine shroud segment 2120 through support member 2190. However, in the embodiment 2100, the ejector shroud segments 2170 are sized to form a continuous ejector shroud, or in other words there are no longitudinal spaces between each of the segments 2170.

Figure 21:
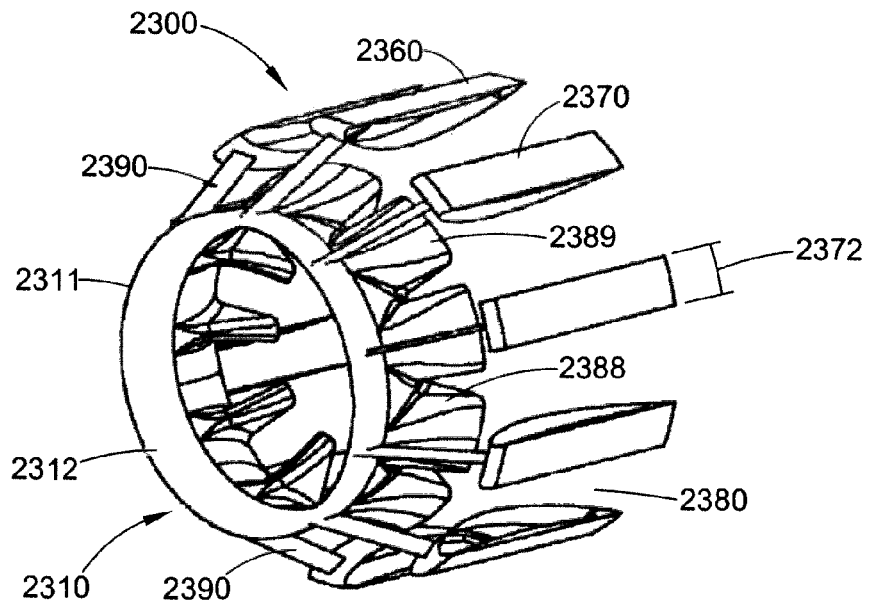
FIG. 21 is an exemplary embodiment of a wind turbine with a continuous turbine shroud and a segmented ejector shroud, the ejector shroud segments being wide and coinciding with the low energy mixing lobes of the turbine shroud. The ejector shroud segments are connected to a leading edge ring member of the turbine shroud.

FIGS. 21-26 are different versions or embodiments of wind turbines having a continuous turbine shroud and a segmented ejector shroud. Referring to FIG. 21, the turbine shroud indicated generally at 2310 is continuous both about the leading edge 2311 and with respect to the high energy mixing lobes 2388 and low energy mixing lobes 2389. The turbine shroud comprises a leading edge ring member 2312 and a plurality of mixing lobes 2388, 2389 along the trailing edge thereof. The turbine shroud 2310 may be assembled from multiple components, or made as one integral piece.

A plurality of ejector shroud segments 2370 are attached to the turbine shroud by support members 2390. The ejector shroud segments 2370 are spaced circumferentially apart from each other, with longitudinal spaces 2380 between adjacent ejector shroud segments. Each ejector shroud segment 2370 has a width or span 2372. As a result, the ejector shroud segments 2370 form an ejector shroud 2360 having a spanwise discontinuous airfoil. The ejector shroud segments 2370 may be spaced evenly about the circumference, when viewed along the central axis of the turbine.

Figure 22:
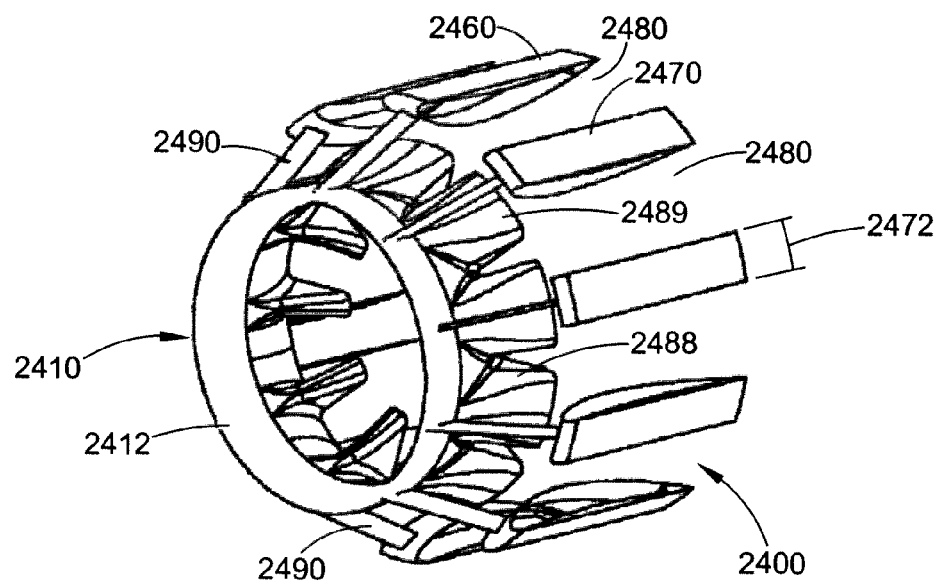
FIG. 22 is an exemplary embodiment of a wind turbine with a continuous turbine shroud and a segmented ejector shroud, the ejector shroud segments being narrow and coinciding with the low energy mixing lobes of the turbine shroud. The ejector shroud segments are connected to a leading edge ring member of the turbine shroud.

Referring to FIG. 22, the turbine shroud indicated generally at 2410 is continuous both about the leading edge 2411 and with respect to the high energy mixing lobes 2488 and low energy mixing lobes 2489. The turbine shroud comprises a leading edge ring member 2412 and a plurality of mixing lobes 2488, 2489 along the trailing edge thereof. The turbine shroud 2410 may be assembled from multiple components, or made as one integral piece. A plurality of ejector shroud segments 2470 are attached to the turbine shroud by support members 2490. The ejector shroud segments 2470 are spaced circumferentially apart from each other, with longitudinal spaces 2480 between adjacent ejector shroud segments. Each ejector shroud segment 2470 has a width or span 2472. As a result, the ejector shroud segments 2470 form an ejector shroud 2460 having a spanwise discontinuous airfoil. The ejector shroud segments 2470 may be spaced evenly about the circumference, when viewed along the central axis of the turbine.

In FIGS. 21-25, the ejector shroud segments are attached to the leading edge ring member. The various versions illustrated in these figures differ in the width of the ejector shroud segment and the location of the ejector shroud segment. In FIG. 21 and FIG. 22 turbine versions 2300, 2400 have, the ejector shroud segments 2370, 2470 are located over the low energy mixing lobes 2389, 2489 of the turbine shroud 2310, 2410.

Figure 23:
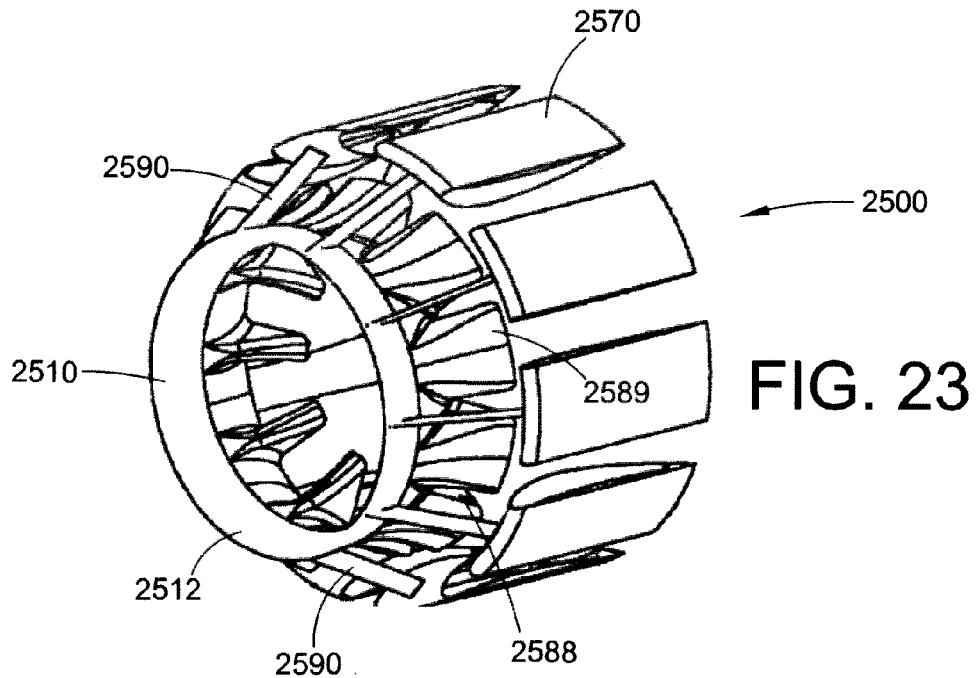
FIG. 23 is an exemplary embodiment of a wind turbine with a continuous turbine shroud and a segmented ejector shroud, the ejector shroud segments being wide and coinciding with the high energy mixing lobes of the turbine shroud. The ejector shroud segments are connected to a leading edge ring member of the turbine shroud.
Figure 24:
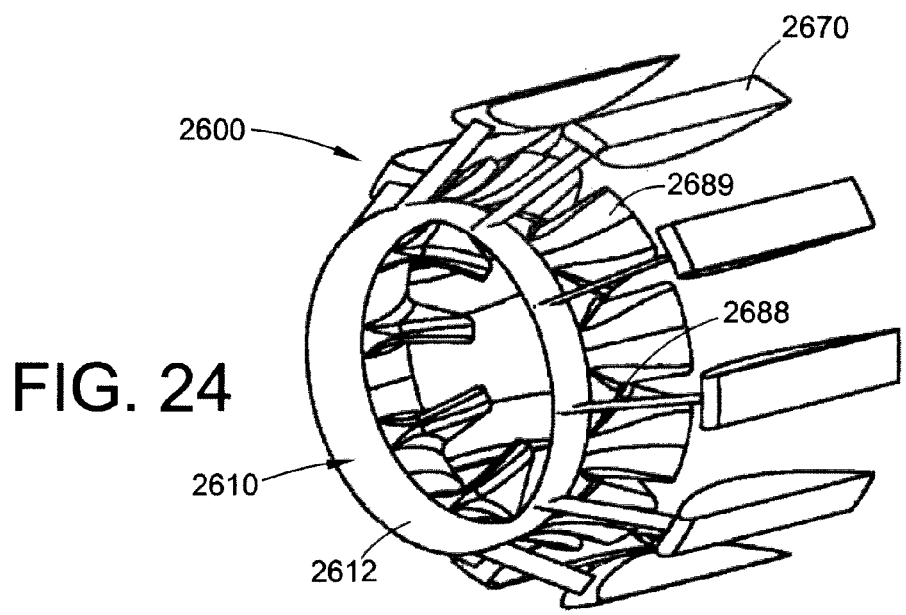
FIG. 24 is an exemplary embodiment of a wind turbine with a continuous turbine shroud and a segmented ejector shroud, the ejector shroud segments being narrow and coinciding with the high energy mixing lobes of the turbine shroud. The ejector shroud segments are connected to a leading edge ring member of the turbine shroud.
Figure 25:
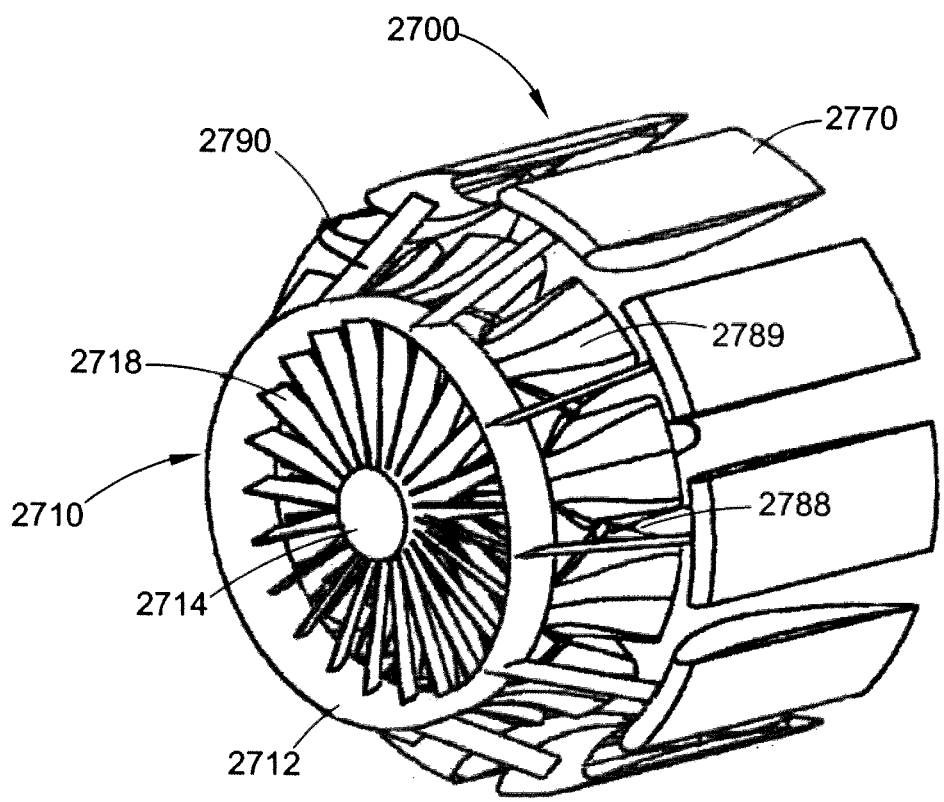
FIG. 25 is similar to FIG. 23, but shows the rotor/stator assembly as well.

In FIGS. 23-25, the turbines 2500, 2600, 2700 have a turbine shroud 2510, 2610, 2710 formed from a continuous leading edge ring member 2512, 2612, 2712. The turbine shroud also has both high energy mixing lobes 2588, 2688, 2788 and low energy mixing lobes 2589, 2689, 2789. The ejector shroud segments 2570, 2670, 2770 are attached to the leading edge ring member by support members 2590, 2690, 2790. Here, the ejector shroud segments 2570, 2670, 2770 are located over the high energy mixing lobes 2588, 2688, 2788 of the turbine shroud.

It should be noted that the impeller is not shown in FIGS. 21-24, but only the shrouds. It is anticipated that the shrouds may be offered as a commercial product separate from the impeller. FIG. 25 does show the turbine shroud 2710 with an impeller. Here, the turbine shroud 2710 is attached to the nacelle 2714 through rotor/stator assembly 2718.

Figure 26:
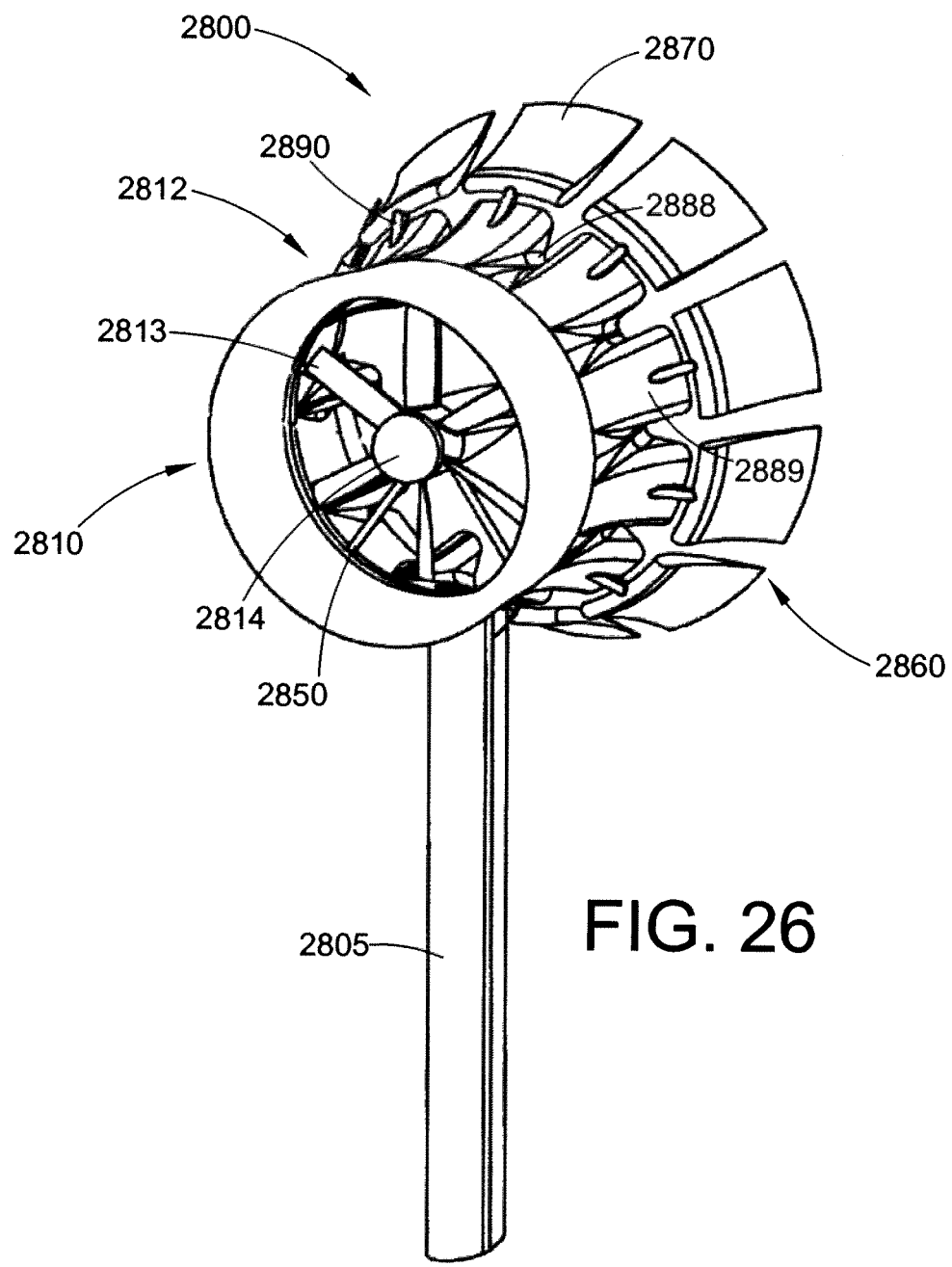
FIG. 26 is an exemplary embodiment of a wind turbine with a continuous turbine shroud and a segmented ejector shroud, each ejector shroud segment being attached to a mixing lobe on the turbine shroud.

In the turbine tower of FIG. 26, the turbine 2800 is mounted on a support tower 2805. The turbine shroud has a leading edge ring member 2812, high energy mixing lobes 2888, and low energy mixing lobes 2889. The turbine shroud is attached to nacelle 2814 through support member 2850. The propeller 2813 is rotatably attached to nacelle 2814 as well. The ejector shroud segments 2870 are attached to the turbine shroud by support member 2890 on mixing lobe 2889. The location for attaching the ejector shroud segments to the turbine shroud may vary depending on the overall length of the turbine shroud 2810.

FIG. 20 and FIG. 26 also differ from the other figures in that the length of the ejector shroud 2160, 2860 is relatively shorter than the length of the turbine shroud 2110, 2810.

Although not illustrated, the present disclosure also contemplates that the ejector shroud, and the ejector shroud segments, may be shaped so that an ejector shroud segment has mixing lobes on a trailing edge as well, similar to a turbine shroud segment.

Figure 27:
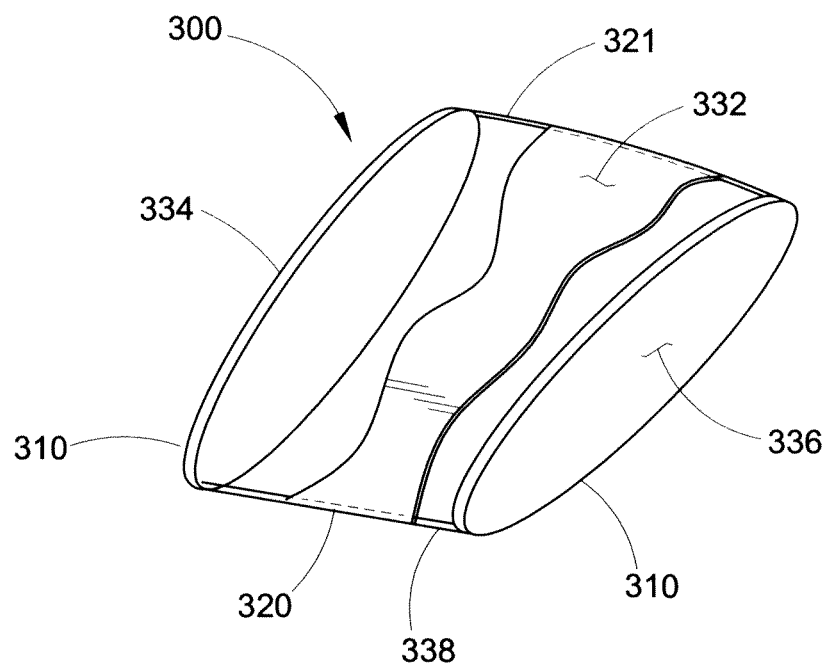
FIG. 27 is a diagram showing a shroud segment with a skeleton and skin structure.

The turbine shroud segments and the ejector shroud segments can be made from a skeleton and a skin that covers the skeleton. This type of manufacture is illustrated in the shroud segment 300 shown in FIG. 27. The skeleton is formed from two spaced ribs 310, the distance between the two ribs defining the chord of the shroud segment. A leading edge crossbar 320 and a trailing edge crossbar 321 extend between and join the two ribs 310 together, the distance between the two crossbars defining the span of the shroud segment. Only one such crossbar is necessary to define the overall shape of the shroud segment, although two crossbars provide additional support, and the trailing edge crossbar may be removed if desired. The leading edge crossbar 320 may also be a suitable attachment point for a support member such as 2890. The skin indicated generally at 330 covers the four sides 332, 334, 336, 338 of the resulting shroud segment 300. This skeleton/skin construction allows for a lightweight structure that is still able to direct air in the proper fashion so that the wind turbine continues to operate.

The skin 330 may be generally formed of any polymeric or fabric material. Exemplary materials include polyurethane, polyfluoropolymers, and multi-layer films of similar composition. Stretchable fabrics, such as spandex-type fabrics or polyurethane-polyurea copolymer containing fabrics, may also be employed. The fabric may include fiberglass or roving. In the present practice it has been found satisfactory that the fabric may include a polyester cloth or a polyamide such as nylon. The fabric may also include a specialty finish or film coating.

Polyurethane films are tough and have good weatherability. The polyester-type polyurethane films tend to be more sensitive to hydrophilic degradation than polyether-type polyurethane films. Polyether-type polyurethane films may also be used. Aliphatic versions of these polyurethane films are generally ultraviolet resistant as well. Aromatic polyurethane films may also be used.

Exemplary polyfluoropolymers include polyvinyldidene fluoride (PVDF) and polyvinyl fluoride (PVF). Commercial versions are available as KYNAR and TEDLAR. Polyfluoropolymers generally have very low surface energy, which allow their surface to remain somewhat free of dirt and debris, as well as shed ice easier compared to materials having a higher surface energy.

Other polymers suitable in the skin of the present disclosure include, but are not limited to, polybutylene terephthalate (PBT) and polytrimethylene terephthalate (PTT).

The skin 330 may be reinforced with a reinforcing material. Examples of reinforcing materials include, but are not limited to, highly crystalline polyethylene fibers, paramid fibers, and polyaramides.

The skin 330 may be attached to the skeleton with a mechanical fastener, an adhesive, or combinations thereof.

The skin may be multi-layer, and independently comprise one, two, three, or more layers. Multi-layer constructions may add strength, water resistance, UV stability, and other functionality. However, multi-layer constructions may also be more expensive and add increased weight to the wind turbines. A woven or scrim portion supports a polymer film in some embodiments.

In some embodiments, a multilayer polymer film includes a fluoropolymer outer film, a polyolefin inner layer, a polyethylene terephthalate (PET) strengthening layer, a polyester scrim layer, and an adhesive bonding layer. The adhesive bonding layer may comprise ethylene vinyl acetate.

The skin 330 may cover all or part of the skeleton; however, the skin is not required to cover the entire skeleton. For example, the skin may not cover the leading and/or trailing edges of the shroud segment. The leading and/or trailing edges of the shroud segment may be comprised of rigid materials. Rigid materials include, but are not limited to, polymers, metals, and mixtures thereof. In some embodiments, the rigid materials are glass reinforced polymers. Rigid surface areas around fluid inlets and outlets may improve the aerodynamic properties of the shrouds. The rigid surface areas may be in the form of panels or other constructions.

Film/fabric composites are also contemplated along with a backing, such as foam.

Alternatively, the shroud segments or portions thereof may be inflatable. For example, continuous shrouds and/or segments of the shrouds may be inflatable. A woven or braided or otherwise machine processed air or gas containment system may be used to generate the correct shape and rigidity of the segments. The segments may be chambered so as to generate the correct shape. For example, the inflatable members may include several internal chambers within for controlling the amount of lift or the degree of inflation. The internal chambers may be arranged around the circumference of the inflatable member, or from one end of the inflatable member to the other end, as as suitable. High inflation pressures, i.e. pressures greater than 20 psig, may be used to ensure the proper rigidity of inflatable parts. The pressure may be produced statically, i.e. from the initial inflation, or may be added over time through an inflation system such as a pump.

The inflatable shroud segments may generally be formed of any polymeric or fabric material as described above for the skin. In particular, the inflatable segments could also be composed of urethane film bladders with a woven or braided cover over the bladder to give it strength and durability. The woven or braided materials may be polyester, pre-stressed polyester, aromatic polyester (trade name VECTRAN® manufactured by Kuraray of Japan), p-phenylene terephtalamide (PpPTA) (trade name TWARON from Akzo), PPTA (poly-paraphenylene terephthalamide) (trade name KEVLAR from DuPont), and polytrimethylene terephthalate (trade name CORTERRA from Shell). The exterior of the woven or braided cover may be coated with various polymers such as cis-polyisoprene, polyurethane, epoxy or polyvinyl chloride. This protects the woven or braided fibers from environmental attack, such as UV or abrasion from sand or other materials that could damage the fibers. Manufacturers include Federal Fabrics-Fibers of Lowell, Mass.; Warwick Mills of New Ipswich, N.H.; Vertigo Inc of Lake Elsinore, Calif.; and ILC Dover of Frederica, Del. The inflatable members may also be partially or completely stiffened through the use of reactive polymer infusion through vacuum assisted resin transfer molding (VARTM) or the curing of previously impregnated polymers such as unsaturated polyesters, epoxy, acrylates or urethanes that are cured through radiation, free radical initiation, or crosslinking with isocyanate.

While particular versions or embodiments have been described, alternatives, modifications, variations, improvements, and substantial equivalents that are or may be presently unforeseen may arise to applicants or other skilled in the art. Accordingly, the appended claims as filed and as they are amended are intended to embrace all such alternatives, modifications, variations, improvements, and substantial equivalents.

What is claimed is:

1. A wind turbine comprising a turbine shroud, the turbine shroud being formed from:
a plurality of turbine shroud segments, each turbine shroud segment having a cambered cross-section and having a first mixing lobe formed on a trailing edge;
wherein the turbine shroud segments are spaced circumferentially apart to form a discontinuous airfoil, second mixing lobes being defined by the spaces between the turbine shroud segments, the turbine shroud segments being oriented to produce low pressure on an interior side of the turbine shroud.

2. The wind turbine of claim 1, wherein the turbine shroud further comprises a continuous leading edge ring member.

3. The wind turbine of claim 1, wherein the turbine shroud segments form a discontinuous leading edge of the turbine shroud.

4. The wind turbine of claim 1, further comprising a center body, the turbine shroud segments being attached to the center body.

5. The wind turbine of claim 1, wherein the mixing lobe has a circumferential surface and two side surfaces.

6. The wind turbine of claim 1, further comprising an ejector shroud located concentrically about and overlapping an outlet end of the turbine shroud, the ejector shroud having an airfoil shape that produces low pressure on an interior side of the ejector shroud.

7. The wind turbine of claim 6, wherein the ejector shroud is formed from a plurality of ejector shroud segments.

8. The wind turbine of claim 7, wherein the ejector shroud segments are spaced circumferentially apart to form a discontinuous airfoil.

9. The wind turbine of claim 8, wherein spaces between the ejector shroud segments are covered with a thin film material to form a continuous surface.

10. The wind turbine of claim 7, wherein at least one ejector shroud segment is attached to each turbine shroud segment by at least one support member.

11. The wind turbine of claim 10, wherein two ejector shroud segments are attached to each turbine shroud segment.

12. The wind turbine of claim 7, wherein the turbine shroud further comprises a continuous leading edge ring member, and each ejector shroud segment is attached to the leading edge ring member by at least one support member.

13. The wind turbine of claim 7, wherein each ejector shroud segment is located over a first mixing lobe.

14. The wind turbine of claim 7, wherein each ejector shroud segment is located over a second mixing lobe.

15. The wind turbine of claim 1, wherein each turbine shroud segment comprises an inflatable member.

16. The wind turbine of claim 1, wherein each turbine shroud segment comprises a skeleton and a skin covering the skeleton, the skin being formed from a fabric or a polymer.

17. The wind turbine of claim 16, wherein the fabric is a fiberglass, polyester, or polyamide.

18. The wind turbine of claim 16, wherein the polymer is a fluoropolymer, a polyolefin, a polyethylene terephthalate, a polyester, an ethylene vinyl acetate, a polyurethane, polybutylene terephthatlate, or polytrimethylene terephthalate.

19. A wind turbine comprising:
a continuous turbine shroud and an ejector shroud located concentrically about an outlet end of the turbine shroud;
wherein the turbine shroud comprises a leading edge ring member and a plurality of mixing lobes along a trailing edge, the leading edge ring member having an airfoil shape that produces low pressure on an inside of the turbine shroud;
wherein the ejector shroud is formed from a plurality of ejector shroud segments attached to the turbine shroud; and
wherein the ejector shroud segments are spaced circumferentially apart to form a discontinuous airfoil shape and oriented to produce low pressure on an inside of the ejector shroud.

20. The wind turbine of claim 19, wherein each ejector shroud segment is attached to the leading edge ring member by at least one support member.

21. The wind turbine of claim 19, wherein each ejector shroud segment is attached to a turbine shroud mixing lobe by at least one support member.

22. A method of making a wind turbine comprising:
(a) providing a wind driven turbine;
(b) forming a plurality of turbine shroud segments having an airfoil cross-section with a first mixing lobe on a trailing edge; and
(c) disposing the turbine shroud segments about the turbine in circumferentially spaced arrangement to form a segmented turbine shroud, the spaces between the segments defining second mixing lobes, the turbine shroud segments being oriented to produce low pressure on an interior side of the turbine shroud.

23. The method defined in claim 22, further comprising disposing an ejector shroud at the trailing edge of the turbine shroud to partially enclose the first and second mixing lobes of the turbine shroud, the ejector shroud including a ring airfoil that produces low pressure on an interior side of the ejector shroud.

24. The method defined in claim 23, wherein the step of disposing an ejector shroud includes forming a plurality of spaced ejector shroud segments about the trailing edge of the turbine shroud.

* * * * *